US012807225B2

(12) United States Patent
Heo et al.

(10) Patent No.: US 12,807,225 B2
(45) **Date of Patent: *Nov. 24, 2026**

(54) POSITION SENSOR AND STEERING APPARATUS

(71) Applicant: HL KLEMOVE CORP., Incheon (KR)

(72) Inventors: Hwan Heo, Incheon (KR); Minyoung Lee, Incheon (KR); Ilki Mun, Gyeonggi-do (KR); Jinseok Bae, Incheon (KR); Jungwook Seo, Incheon (KR)

(73) Assignee: HL KLEMOVE CORP., Incheon (KR)

(*) Notice: Subject to any disclaimer, the term of this patent is extended or adjusted under 35 U.S.C. 154(b) by 546 days.

This patent is subject to a terminal disclaimer.

(21) Appl. No.: 18/219,041

(22) Filed: Jul. 6, 2023

(65) Prior Publication Data

US 2024/0010275 A1 Jan. 11, 2024

(30) Foreign Application Priority Data

Jul. 7, 2022 (KR) ........................ 10-2022-0083605
Dec. 19, 2022 (KR) ........................ 10-2022-0178594

(51) Int. Cl.
*B62D 15/02* (2006.01)
*B62D 5/00* (2006.01)
(Continued)

(52) U.S. Cl.
CPC ......... *B62D 15/0215* (2013.01); *B62D 5/001* (2013.01); *B62D 5/0427* (2013.01);
(Continued)

(58) Field of Classification Search
CPC .. B62D 15/0215; B62D 5/001; B62D 5/0427; B62D 5/046; G01B 7/30; G01D 5/20
See application file for complete search history.

(56) References Cited

U.S. PATENT DOCUMENTS

2011/0080162 A1* 4/2011 Steinich .................... G01B 7/30
324/207.25
2015/0323349 A1* 11/2015 Has .................... B62D 15/0215
324/207.25

(Continued)

FOREIGN PATENT DOCUMENTS

CN 102032862 4/2011
CN 105241373 1/2016

(Continued)

OTHER PUBLICATIONS

Office Action dated Mar. 7, 2024 for German Patent Application No. 102023117954.3 and its English translation provided by Google.

(Continued)

*Primary Examiner* — Stephanie E Bloss
*Assistant Examiner* — Michael A Harrison
(74) *Attorney, Agent, or Firm* — WOMBLE BOND DICKINSON (US) LLP

(57) ABSTRACT

A position sensor includes a substrate; a first initial shaft positioned in a first side space defined by a first surface of the substrate; a first initial gear and a first initial rotor mounted to the first initial shaft in the first side space; a sub-shaft passing through the substrate; a first sub-gear mounted to the sub-shaft in the first side space, and engaged with the first initial gear; a second sub-gear mounted to the sub-shaft in a second side space defined by a second surface of the substrate; a second initial shaft positioned in the second side space; a second initial gear and a second initial rotor mounted to the second initial shaft in the second side space, the second initial gear engaged with the second sub-gear; and first and second sensing coils disposed on the first and second surfaces of the substrate, respectively.

20 Claims, 10 Drawing Sheets

(51) Int. Cl.
*B62D 5/04* (2006.01)
*G01B 7/30* (2006.01)
*G01D 5/20* (2006.01)

(52) U.S. Cl.
CPC ............... *B62D 5/046* (2013.01); *G01B 7/30* (2013.01); *G01D 5/20* (2013.01)

(56) References Cited

U.S. PATENT DOCUMENTS

| | | | | |
|---|---|---|---|---|
| 2017/0160101 | A1* | 6/2017 | Frese | G01D 5/147 |
| 2019/0002015 | A1* | 1/2019 | Hwang | B62D 5/0463 |
| 2021/0276611 | A1 | 9/2021 | Yang et al. | |

FOREIGN PATENT DOCUMENTS

| | | | |
|---|---|---|---|
| CN | 105992933 | | 10/2016 |
| CN | 107356193 | A | 11/2017 |
| CN | 109682295 | | 4/2019 |
| CN | 113039115 | | 6/2021 |
| DE | 102009031012 | A1 | 4/2010 |
| DE | 102010002794 | A1 | 11/2010 |
| DE | 102009048389 | A1 | 5/2011 |
| DE | 102013010415 | A1 | 1/2014 |
| DE | 102014208642 | A1 | 11/2015 |
| DE | 102015202732 | A1 | 8/2016 |
| DE | 102016109206 | A1 | 11/2016 |
| DE | 102020123055 | A1 | 3/2021 |
| DE | 102020108981 | A1 | 10/2021 |
| KR | 10-2019-0001964 | | 1/2019 |

OTHER PUBLICATIONS

Office Action (1st) dated Feb. 26, 2026 for Chinese Patent Application No. 202310834523.5 and its English translation provided by Applicant's foreign counsel.
Office Action (1st) dated Mar. 18, 2026 for Korean Patent Application No. 10-2022-0178594 and its English translation provided by Applicant's foreign counsel.
Office Action (2nd) dated Jun. 24, 2026 for Chinese Patent Application No. 202310834523.5 and its English translation provided by Applicant's foreign counsel.

* cited by examiner

POSITION SENSOR AND STEERING APPARATUS

CROSS-REFERENCE TO RELATED APPLICATION

This application claims the benefit of Korean Patent Application No. 10-2022-0083605, filed on Jul. 7, 2022 and No. 10-2022-0178594, filed on Dec. 19, 2022 in the Korean Intellectual Property Office, the disclosures of which are incorporated herein by reference in its entirety.

BACKGROUND

1. Technical Field

Some embodiments of the present disclosure generally relate to a position sensor and a steering apparatus capable of detecting a position and/or movement of a rack bar of a vehicle.

2. Description of the Related Art

In general, a steering apparatus for controlling a traveling direction of a vehicle may include a steering wheel disposed at a driver's seat, a steering column connected to the steering wheel, a rack gear/pinion gear that converts rotational motion provided from the steering column into linear motion, a rack bar connected to the rack gear, and the like.

In addition, the steering apparatus may include an angle sensor that measures a rotation angle of the steering column that rotates as a driver rotates the steering wheel, and a torque sensor that measures torque applied to the steering wheel by the driver to rotate the steering wheel. An electronic control unit (ECU) of the steering apparatus may determine a steering angle of the vehicle based on outputs of the angle sensor and the torque sensor.

In recent years, research on omitting a mechanical connection between the steering wheel and the rack bar in the steering apparatus has been conducted. A so-called steering-by-wire steering apparatus may detect the rotation of the steering wheel using the angle sensor and the torque sensor and linearly move the rack bar using a motor.

As such, since the mechanical connection between the steering wheel and the rack bar can be removed in the steer-by-wire steering apparatus, an additional sensor for detecting the linear motion of the rack bar may be required.

SUMMARY

Therefore, it is an aspect of the present disclosure to provide a position sensor and a steering apparatus capable of detecting a position and/or movement of a rack bar of a vehicle.

It is another aspect of the present disclosure to provide a position sensor and a steering apparatus capable of improving reliability, stability, and robustness of position detection and movement detection of a rack bar of a vehicle.

Additional aspects of the disclosure will be set forth in part in the description which follows and, in part, will be obvious from the description, or may be learned by practice of the disclosure.

In accordance with one aspect of the present disclosure, a position sensor includes a substrate including a first surface and a second surface; a first initial shaft provided on a first side corresponding to the first surface of the substrate, and extending perpendicular to the substrate; a first initial gear provided on the first side of the substrate and configured to rotate about the first initial shaft; a first initial rotor provided on the first side of the substrate and configured to rotate about the first initial shaft; a first sensing coil provided on the first surface of the substrate; a sub-shaft extending from the first side of the substrate to a second side corresponding to the second surface of the substrate, to be perpendicular to the substrate and parallel to the first initial shaft; a first sub-gear provided on the first side of the substrate, configured to rotate about the sub-shaft and engaged with the first initial gear; a second sub-gear provided on the second side of the substrate and configured to rotate about the sub-shaft; a second initial shaft separated from the first initial shaft and provided on the second side of the substrate, and extending perpendicular to the substrate and parallel to the sub-shaft; a second initial gear provided on the second side of the substrate, configured to rotate about the second initial shaft, and engaged with the second sub-gear; a second initial rotor provided on the second side of the substrate and configured to rotate about the second initial shaft; and a second sensing coil provided on the second surface of the substrate.

A first gear ratio between the first initial gear and the first sub-gear may be different from a second gear ratio between the second initial gear and the second sub-gear.

A diameter of the first initial gear may be different from a diameter of the second initial gear.

A diameter of the first sub-gear may be different from a diameter of the second sub-gear.

A diameter of the first initial gear may be the same as a diameter of the first sub-gear, and a diameter of the second initial gear may be smaller than a diameter of the second sub-gear.

The first initial gear and the first initial rotor may rotate about a rotation axis of the first initial shaft, and the second initial gear and the second initial rotor may rotate about a rotation axis of the second initial shaft.

An imaginary straight line extending from a rotation axis of the first initial rotor may pass through a center of the first sensing coil, and an imaginary straight line extending from a rotation axis of the second initial rotor may pass through a center of the second sensing coil.

The first initial rotor may include a plurality of first rotor teeth provided on a circumference of the first initial rotor, and the second initial rotor may include a plurality of second rotor teeth provided on a circumference of the second initial rotor.

The first sensing coil may be disposed in a zigzag manner between an imaginary first circle having a first radius and an imaginary second circle having a second radius greater than the first radius, and the second sensing coil may be disposed in a zigzag manner between an imaginary third circle having a third radius and an imaginary fourth circle having a fourth radius greater than the third radius.

A radial width of each of the plurality of first rotor teeth may be equal to a difference between the second radius and the first radius, and a radial width of each of the plurality of second rotor teeth may be equal to a difference between the fourth radius and the third radius.

A circumferential width of each of the plurality of first rotor teeth may be equal to a distance to an adjacent first rotor tooth, and a circumferential width of each of the plurality of second rotor teeth may be equal to a distance to an adjacent second rotor tooth.

The position sensor may further include a processor electrically connected to the first sensing coil and the second sensing coil.

The processor may be configured to identify impedance or reluctance of the first sensing coil and identify a rotation angle of the first initial rotor based on identifying the impedance or reluctance of the first sensing coil. The processor may be configured to identify impedance or reluctance of the second sensing coil and identify a rotation angle of the second initial rotor based on identifying the impedance or reluctance of the second sensing coil.

The processor may be configured to identify a rotation angle of the first initial shaft based on the rotation angle of the first initial rotor and the rotation angle of the second initial rotor.

The first initial shaft may be connected to a rack bar assembly of a vehicle.

In accordance with another aspect of the present disclosure, a steering apparatus includes a rack bar assembly connected to wheels of a vehicle, a steering motor configured to provide rotation for linearly moving the rack bar assembly, an angle sensor configured to identify a rotation angle of a steering column connected to a steering wheel of the vehicle, a first initial shaft connected to the rack bar assembly, a position sensor configured to measure a rotation angle of the first initial shaft, and a controller configured to control the steering motor based on an output signal of the angle sensor and an output signal of the position sensor. The position sensor includes a substrate including a first surface and a second surface, the first initial shaft provided on the first side corresponding to the first surface of the substrate and extending perpendicular to the substrate; a first initial gear provided on a first side corresponding to the first surface of the substrate and configured to rotate about the first initial shaft; a first initial rotor provided on the first side of the substrate and configured to rotate about the first initial shaft; a first sensing coil provided on the first surface of the substrate; a sub-shaft extending from the first side of the substrate to a second side corresponding to the second surface of the substrate, to be perpendicular to the substrate and parallel to the first initial shaft; a first sub-gear provided on the sub-shaft on the first side of the substrate, configured to rotate about the sub-shaft and engaged with the first initial gear; a second sub-gear provided on the second side of the substrate and configured to rotate about the sub-shaft; a second initial shaft separated from the first initial shaft and provided on the second side of the substrate, and extending perpendicular to the substrate and parallel to the sub-shaft; a second initial gear provided on the second side of the substrate, configured to rotate about the second initial shaft, and engaged with the second sub-gear; a second initial rotor provided on the second side of the substrate and configured to rotate about the second initial shaft; and a second sensing coil provided on the second surface of the substrate.

A first gear ratio between the first initial gear and the first sub-gear may be different from a second gear ratio between the second initial gear and the second sub-gear.

A diameter of the first initial gear may be different from a diameter of the second initial gear, and a diameter of the first sub-gear may be different from a diameter of the second sub-gear.

The position sensor may further include a processor electrically connected to the first sensing coil and the second sensing coil. The processor may be configured to identify impedance or reluctance of the first sensing coil, identify a rotation angle of the first initial rotor based on identifying the impedance or reluctance of the first sensing coil, identify impedance or reluctance of the second sensing coil, and identify a rotation angle of the second initial rotor based on identifying the impedance or reluctance of the second sensing coil.

The processor may be configured to identify a rotation angle of the first initial shaft based on the rotation angle of the first initial rotor and the rotation angle of the second initial rotor and provide an output signal corresponding to the rotation angle of the first initial shaft to the controller.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Figure 1:
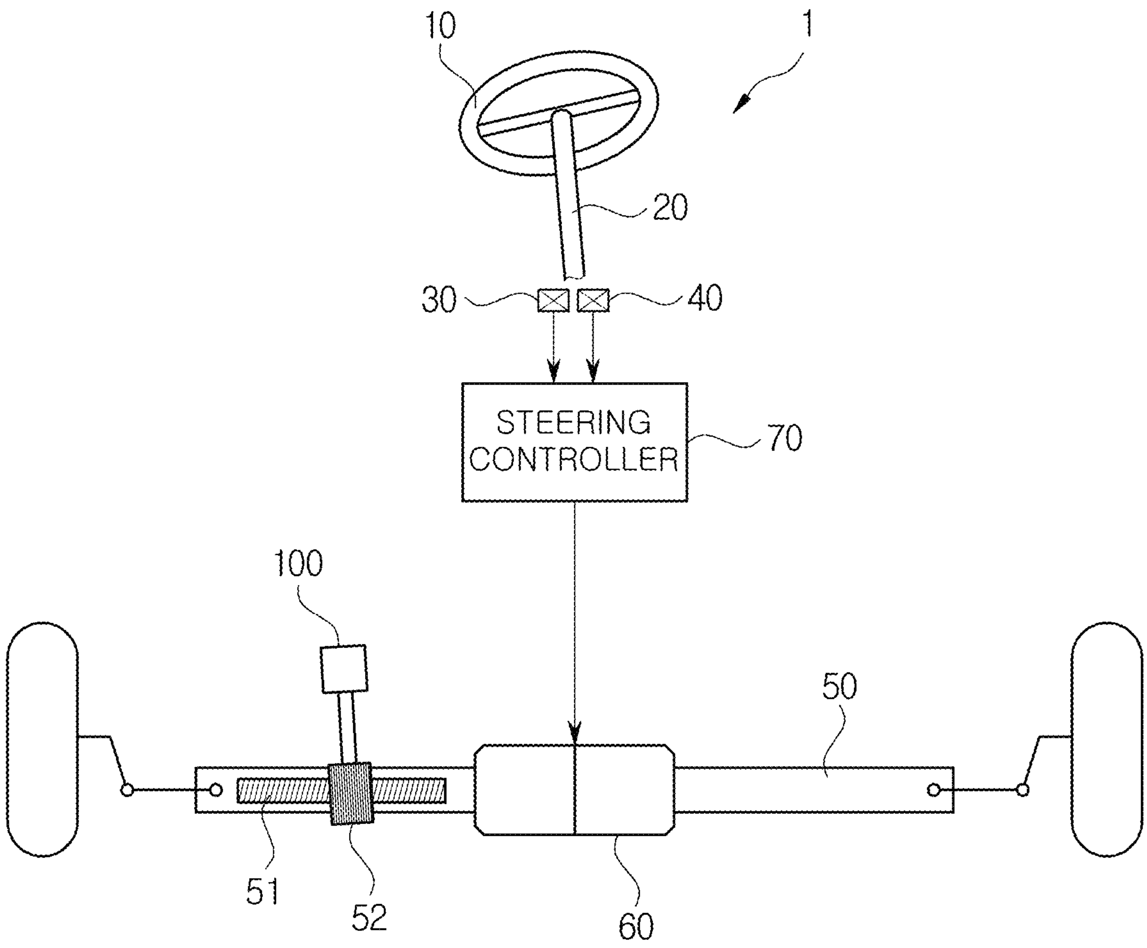
FIG. 1 illustrates a conceptual diagram of a steering apparatus including a position sensor in accordance with an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

FIG. 1 illustrates a conceptual diagram of a steering apparatus including a position sensor in accordance with an embodiment of the present disclosure.

Referring to FIG. 1, a steering apparatus 1 may include one or more of a steering wheel 10, a steering column 20, an angle sensor 30, a torque sensor 40, a rack bar assembly 50, a steering motor 60, a position sensor 100, or a steering controller 70. Some components illustrated in FIG. 1 may not be to essential components of the steering apparatus 1, and at least some of the components illustrated in FIG. 1 may be omitted.

The steering wheel 10 may receive or obtain an input associated with or related to a traveling direction of a vehicle or a driver's input, manipulation or steering intention (hereinafter, referred to as a "steering input") from the driver. The steering wheel 10 may rotate clockwise or counterclockwise according to the driver's steering input.

The steering column 20 may be operably connected to and support the steering wheel 10 and function as a rotation axis of the steering wheel 10. The steering column 20 may rotate with the rotation of the steering wheel 10.

The angle sensor 30 may detect rotation of the steering wheel 10 or the steering column 20 by the driver and measure a rotation angle of the steering wheel or the steering column 20. The angle sensor 30 may generate or provide an electrical signal corresponding to the measured rotation angle to the steering controller 70.

The torque sensor 40 may detect rotation of the steering wheel 10 or the steering column 20 and measure torque applied to the steering wheel 10 or the steering column 20 by the driver. The torque sensor 40 may generate or provide an electrical signal corresponding to the measured torque to the steering controller 70.

The rack bar assembly 50 may be connected to vehicle wheels of the vehicle and be configured to be linearly movable by the drive of the steering motor 60. The rack bar assembly 50 may change a rotation axis direction of the vehicle wheels to change the traveling direction of the vehicle. For example, the rack bar assembly 50 may move linearly to rotate the rotation axis of the vehicle wheel counterclockwise so that the vehicle may turn left. In addition, the rack bar assembly 50 may move linearly to rotate the rotation axis of the vehicle wheel clockwise such that the vehicle may turn right.

The steering motor 60 may be operably connected to the rack bar assembly through a power conversion device and provide rotational force for linearly moving the rack bar assembly 50. The steering motor 60 may generate or provide rotational force for linearly moving the rack bar assembly 50 to the left or right in response to control of the steering controller 70. For example, the rotation of the steering motor may be converted into linear motion through a rack gear and/or a pinion gear which may be included in the power conversion device.

The position sensor 100 may detect the linear motion of the rack bar assembly 50 and measure linear displacement of the rack bar assembly 50. For example, the linear motion of the rack bar assembly 50 may be converted into rotational motion through a rack gear 51 and a pinion gear 52, and the position sensor 100 may measure the displacement of the rotational motion of a shaft coupled to the pinion gear 52 which is converted from the linear motion of the rack bar assembly 50. The position sensor 100 may generate or provide an electrical signal corresponding to the measured displacement of the rack bar assembly 50, or a displacement associated with the rack bar assembly 50, to the steering controller 70.

The steering controller 70 may receive or obtain detection signals output from the angle sensor 30, the torque sensor 40, and/or the position sensor 100, and control the steering motor 60 based on the obtained detection signals.

For example, the steering controller 70 may identify the driver's steering input and/or steering intention based on output signals of the angle sensor 30 and/or the torque sensor 40. The steering controller 70 may control the steering motor 60 to move the rack bar assembly 50 to a target position based on the identified steering input and/or steering intention.

The steering controller 70 may identify an actually measured position of the rack bar assembly 50 based on the output signal of the position sensor 100. In addition, the steering controller 70 may compare the actually measured position with the target position, and control the steering motor 60 so that the actually measured position of the rack bar assembly 50 can follow the target position.

In this way, the angle sensor 30 may detect the driver's steering input. Further, the position sensor 100 may detect the displacement of the rack bar assembly 50.

The angle sensor 30 and the position sensor 100 may perform the same or at least a similar function of identifying the rotation angle of the shaft such as the steering column 20 or a shaft coupled to the pinion gear 52. Further, the angle sensor and the position sensor 100 may have the same or at least a similar structure although not required.

Hereinafter, a detailed structure and operation of the position sensor 100 will be described, and a specific structure and operation of the angle sensor 30 may be substantially the same as or similar to those described below.

Figure 2:
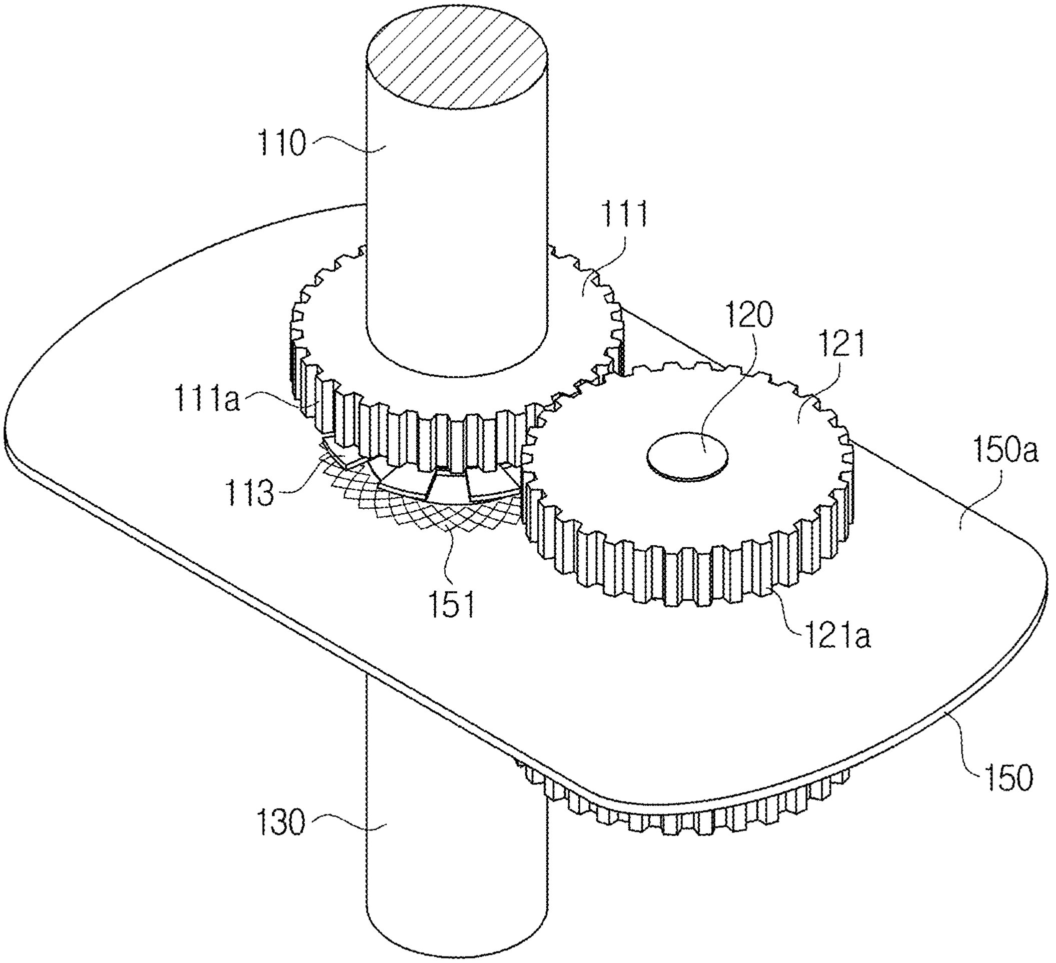
FIG. 2 is an upper perspective view of a position sensor in accordance with an embodiment of the present disclosure.
Figure 3:
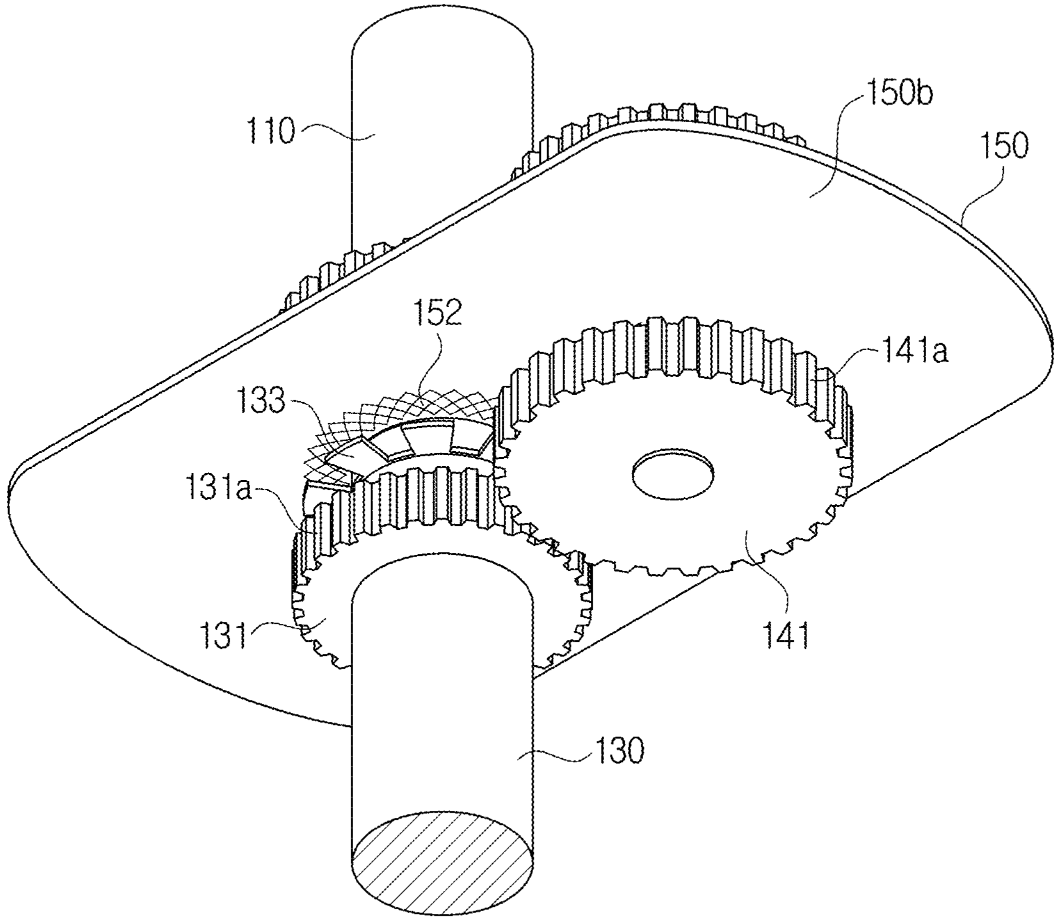
FIG. 3 is a lower perspective view of a position sensor in accordance with an embodiment of the present disclosure.
Figure 4:
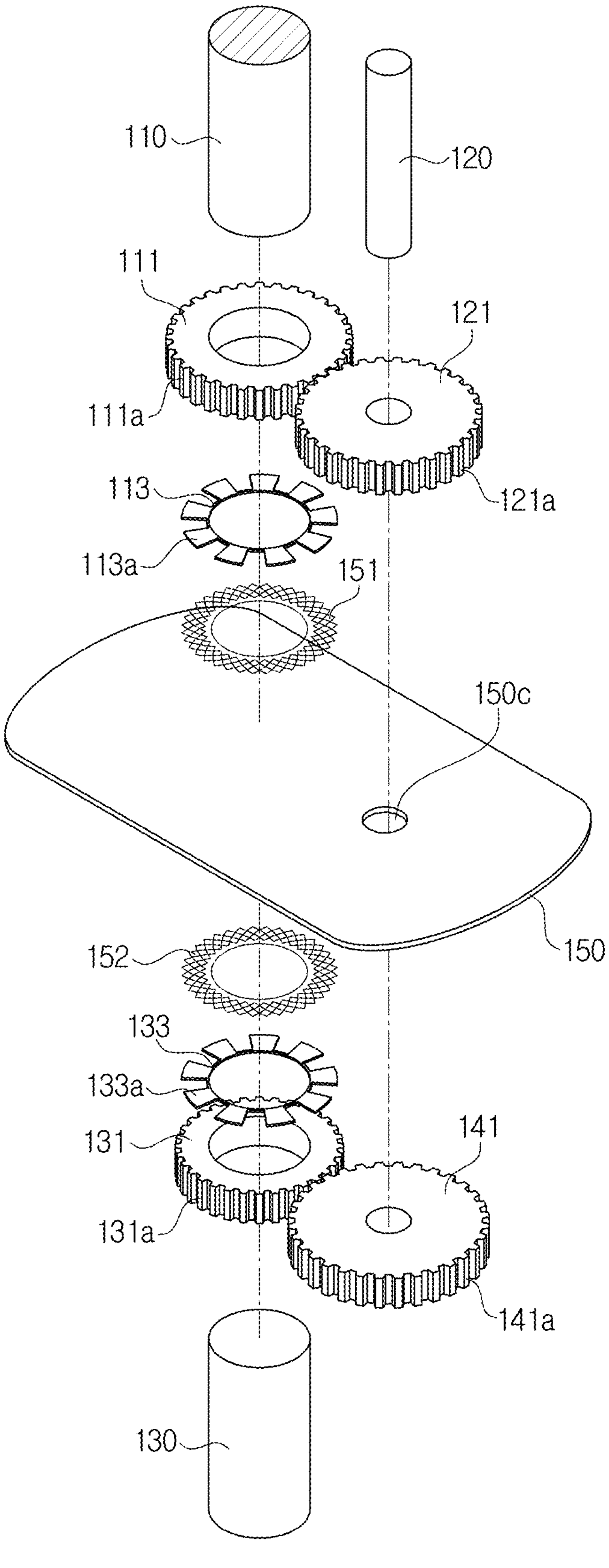
FIG. 4 is an exploded view of a position sensor in accordance with an embodiment of the present disclosure.
Figure 5:
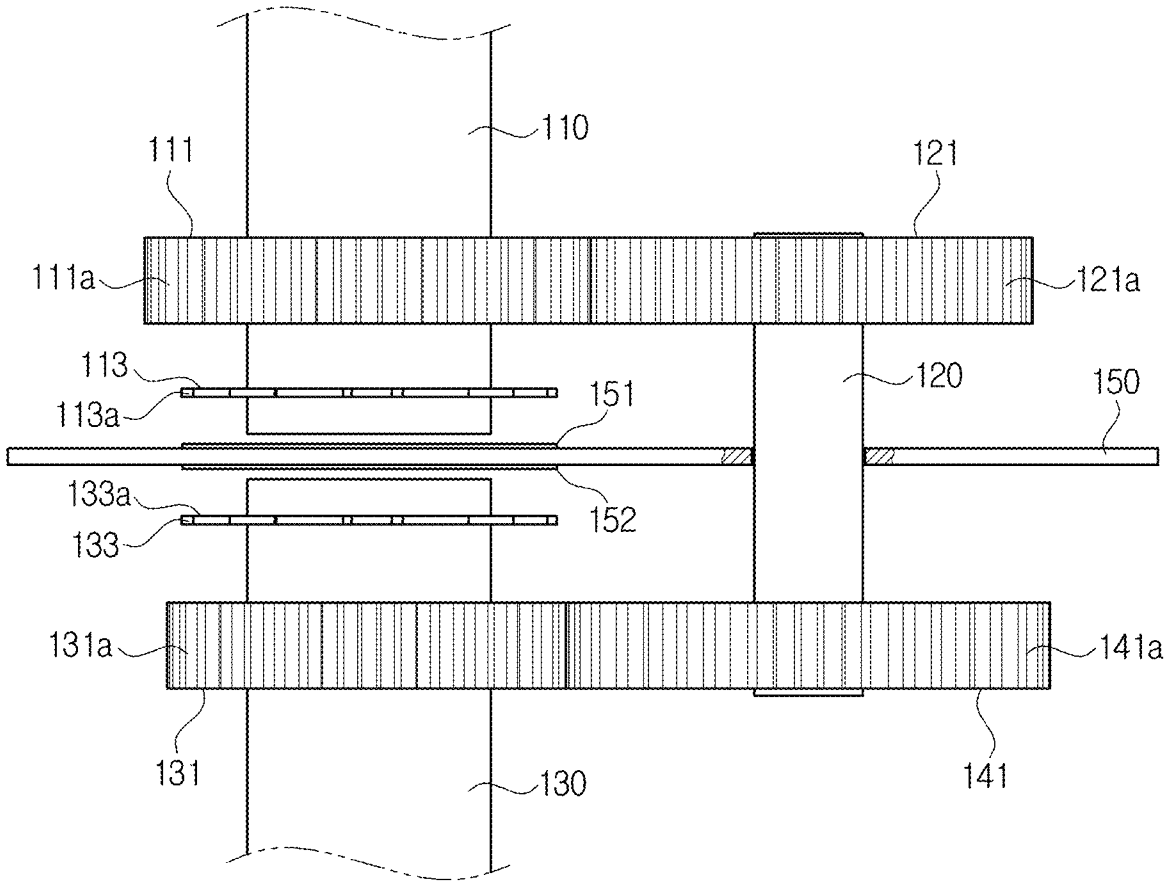
FIG. 5 is a side view of a position sensor in accordance with an embodiment of the present disclosure.
Figure 6:
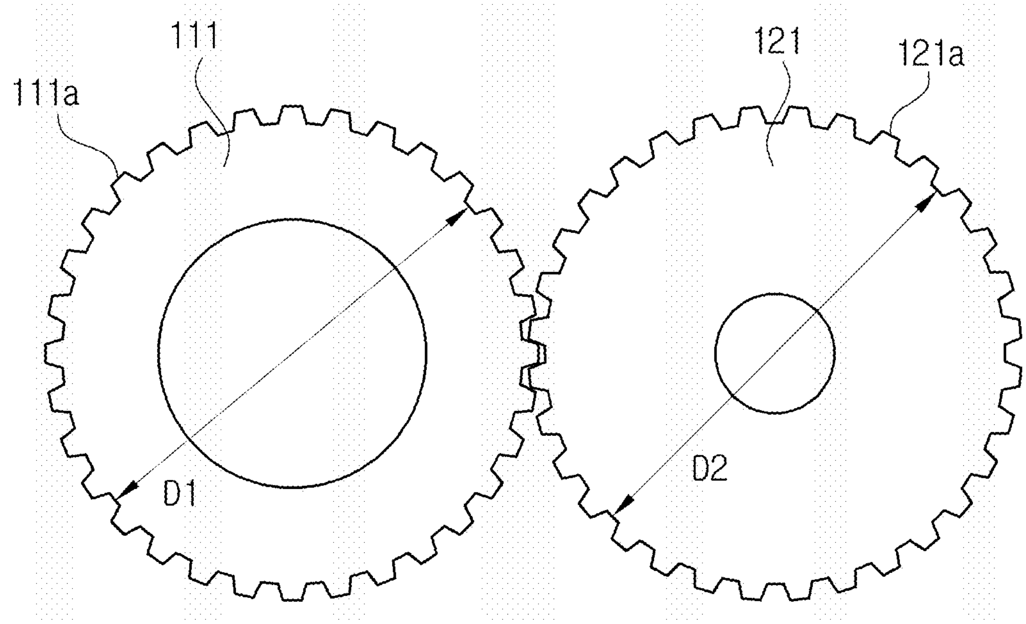
FIG. 6 illustrates a first initial gear and a first sub-gear included in a position sensor in accordance with an embodiment of the present disclosure.
Figure 7:
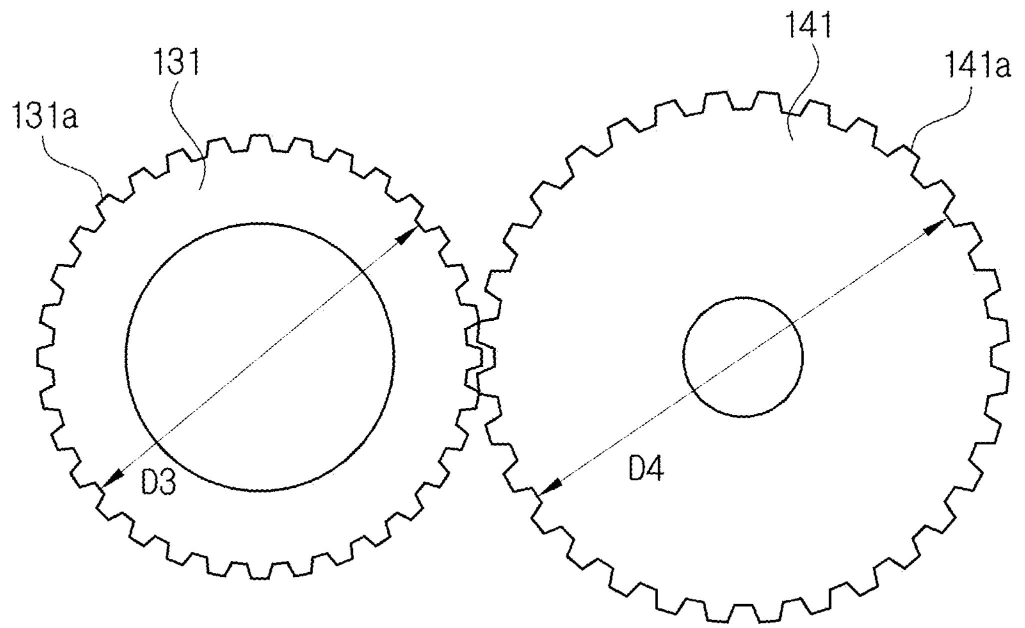
FIG. 7 illustrates a second initial gear and a second sub-gear included in a position sensor in accordance with an embodiment of the present disclosure.
Figure 8:
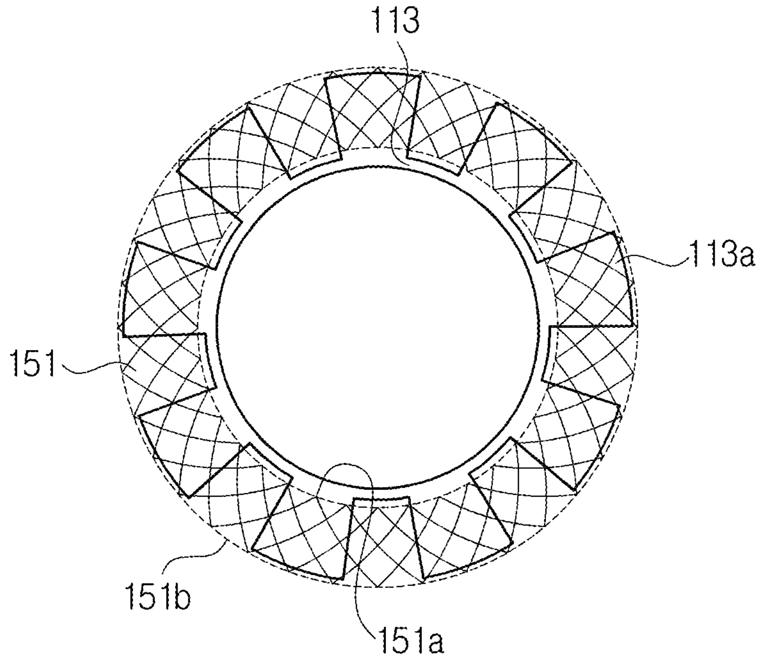
FIG. 8 illustrates a first rotor and a first sensing coil included in a position sensor in accordance with an embodiment of the present disclosure.

FIG. 2 is an upper perspective view of a position sensor in accordance with an embodiment of the present disclosure. FIG. 3 is a lower perspective view of a position sensor in accordance with an embodiment of the present disclosure. FIG. 4 is an exploded view of a position sensor in accordance with an embodiment of the present disclosure. FIG. 5 is a side view of a position sensor in accordance with an embodiment of the present disclosure. FIG. 6 illustrates a first initial gear and a first sub-gear included in a position sensor in accordance with an embodiment of the present disclosure. FIG. 7 illustrates a second initial gear and a second sub-gear included in a position sensor in accordance with an embodiment of the present disclosure. FIG. 8 illustrates a first rotor and a first sensing coil included in a position sensor in accordance with an embodiment of the present disclosure.

As illustrated in FIGS. 2 to 8, the position sensor 100 may include a first initial shaft 110, a first initial gear 111, a first initial rotor 113, a first sensing coil 151, a sub-shaft 120, a first sub-gear 121, a second sub-gear 141, a second initial gear 131, a second initial shaft 130, a second initial rotor 133, a second sensing coil 152, or a substrate 150. Some components illustrated in FIGS. 2 to 8 may not be essential components of the position sensor 100, and at least some of the components illustrated in FIGS. 2 to 8 may be omitted.

The first initial shaft 110 may be coupled or connected to the rack bar assembly 50 through a power conversion device. The power conversion device may convert the linear motion of the rack bar assembly 50 into the rotational motion of the first initial shaft 110. For example, the power conversion device may include the rack gear 51 and the pinion gear 52.

The first initial shaft 110 may rotate according to the linear motion of the rack bar assembly 50. For example, as the rack bar assembly 50 linearly moves in a first direction, the first initial shaft 110 may rotate in a first rotational direction (e.g. clockwise). And, as the rack bar assembly 50 linearly moves in a second direction different from or opposite to the first direction, the first initial shaft 110 may rotate in a second rotational direction (e.g. counterclockwise) different from or opposite to the first rotational direction.

The first initial shaft 110 may be positioned or provided in a first side space defined by a first surface 150*a* of the substrate 150 (for example, positioned above the first surface 150*a* of the substrate 150) and may be extended substantially perpendicular to the substrate 150. Specifically, the first initial shaft 110 extends to the vicinity of the substrate 150, but may not pass through the substrate 150.

The first initial gear 111 may be provided in the first side space defined by the first surface 150*a* of the substrate 150 (for example, positioned above the first surface 150*a* of the substrate 150) and the first initial gear 111 may be in a substantially cylindrical shape.

The first initial gear 111 may be mounted to or provided on the first initial shaft 110 to be rotatable together with the first initial shaft 110. Specifically, the first initial gear 111 may be disposed or provided on the same axis as the first initial shaft 110 such that the first initial gear 111 may coaxially rotate at the same rotational speed in the same rotational direction as the first initial shaft 110 about the same axis as the rotation axis of the first initial shaft 110.

A plurality of first initial teeth 111*a* may be formed on an outer circumferential surface of the first initial gear 111. As the first initial gear 111 rotates, the plurality of first initial teeth 111*a* may rotate and move along the outer circumferential surface of the first initial gear 111.

The first initial rotor 113 may be disposed or provided between the substrate 150 and the first initial gear 111 in the first side space defined by the first surface 150*a* of the substrate 150 (for example, positioned above the first surface 150*a* of the substrate 150), and the first initial rotor 113 may be in a substantially disc shape. In other words, the substrate 150, the first initial rotor 113, and the first initial gear 111 may be stacked on the first surface 150*a* of the substrate 150 in order.

The first initial rotor 113 may be mounted to or provided on the first initial shaft 110 in a substantially disc shape. The first initial rotor 113 may be coaxially disposed or provided on the same axis as the first sub-shaft 120 to be rotatable together with the first sub-shaft 120 so that the first initial rotor 113 may rotate at the same rotational speed in the same rotational direction as the first initial shaft 110 about the same axis as the rotation axis of the first initial shaft 110. Further, the first initial rotor 113 may rotate at the same rotational speed in the same rotational direction as the first initial gear 111 about the same axis as the rotation axis of the first initial gear 111.

As illustrated in FIG. 8, a plurality of first rotor teeth 113*a* may be formed on an outer circumference of the first initial rotor 113. Cavities or slots may be formed between the plurality of first rotor teeth 113*a*.

Shapes of the plurality of first rotor teeth 113*a* may be substantially the same as each other, but not required. In addition, shapes of the cavities or slots between the plurality of first rotor teeth 113*a* may also be substantially the same as each other. Widths and distances of the plurality of first rotor teeth 113*a* in a circumferential direction may be substantially constant. In other words, the circumferential width of each of the plurality of first rotor teeth 113*a* may be substantially the same as the circumferential distance between two adjacent first rotor teeth 113*a*.

For example, the first rotor teeth 113*a* may be regularly or periodically formed along the outer circumference of the first initial rotor 113. In addition, while the first rotor teeth 113*a* revolve, the first rotor teeth 113*a* may regularly or periodically pass near a specific position of the substrate 150.

A diameter of the first initial rotor 113 is not limited to a specific diameter. For example, the diameter of the first initial rotor 113 may be greater than, equal to, or smaller than a diameter of the first initial gear 111.

The first sensing coil 151 may be disposed or provided on the first surface 150*a* of the substrate 150 and the first sensing coil 151 may be in a substantially disc shape. The first sensing coil 151 is fixed to the first surface 150*a* of the substrate 150 and does not rotate together with the first initial shaft 110.

The first sensing coil 151 is in a zigzag pattern. For instance, the first sensing coil 151 may be disposed or arranged in a zigzag manner between circumferences of imaginary circles having different radii. For example, as illustrated in FIG. 8, the first sensing coil 151 may be disposed or arranged in a zigzag manner between an imaginary first circle 151*a* having a first radius and an imaginary second circle 151*b* having a second radius larger than the first radius.

In other words, a distance between the first sensing coil 151 and the center of the first sensing coil 151 may periodically change. For example, the first sensing coil 151 may extend from a circumference of the first circle 151*a* to a circumference of the second circle 151*b*, then extend from the circumference of the second circle 151*b* to the circumference of the first circle 151*a*, and then be repeated in turn. This extension of the first sensing coil 151 from the circumference of the first circle 151*a* to the circumference of the second circle 151*b*, and from the circumference of the second circle 151*b* to the circumference of the first circle 151*a* may be repeated.

An area occupied by the first sensing coil 151 may be substantially the same as an area occupied by the plurality of first rotor teeth 113*a* of the first initial rotor 113. For instance, the first sensing coil 151 is positioned where the first rotor teeth 113*a* are formed. In other words, the plurality of first rotor teeth 113*a* of the first initial rotor 113 may be positioned to correspond to an annular area between the first circle 151*a* and the second circle 151*b* forming the first sensing coil 151. A radial width of each of the first rotor teeth 113*a* may be substantially the same as a radial width of the annular area between the first circle 151*a* and the second circle 151*b*.

The center of the annular first sensing coil 151 may be substantially the same as, or be coaxial with, the center of the first initial rotor 113. In other words, an imaginary first straight line extending from the rotation axis of the first initial rotor 113 may pass through the center of the annular first sensing coil 151.

The first initial rotor 113 may be provided in the vicinity of the first sensing coil 151. In other words, the first initial rotor 113 may rotate about the center of the first sensing coil 151 in the vicinity of the first sensing coil 151.

Thereby, the plurality of first rotor teeth 113*a* may periodically pass near the first sensing coil 151 when the first initial rotor 113 rotates.

In this case, the first initial rotor 113 and the plurality of first rotor teeth 113*a* may be made of a magnetic material, and as the plurality of first rotor teeth 113*a*, which are made of the magnetic material, periodically pass near the first sensing coil 151, the reluctance of the first sensing coil 151 may periodically change and the impedance of the first sensing coil 151 may also periodically change. For example, the impedance or reluctance of the first sensing coil 151 may change in a cycle in which the first initial rotor 113 rotates once.

Therefore, the rotation of the first initial rotor 113 may be detected or identified by measuring the periodic change in impedance or reluctance of the first sensing coil 151.

The sub-shaft 120 may be provided substantially parallel to the first initial shaft 110. Further, the sub-shaft 120 may be provided substantially perpendicular to the substrate 150. Specifically, the sub-shaft 120 may pass through the substrate 150 through a through-hole 150*c* formed in the substrate 150. The sub-shaft 120 may pass through the through-hole 150*c* from the first surface 150*a* of the substrate 150 to a second surface 150*b* of the substrate 150.

The first sub-gear 121 may be positioned in the first side space defined by the first surface 150*a* of the substrate 150 (for example, positioned above the first surface 150*a* of the substrate 150) and may be in a substantially cylindrical shape.

The first sub-gear 121 may be fixed to or provided on the sub-shaft 120. Specifically, the first sub-gear 121 may be provided on the same axis as, or coaxial with, the sub-shaft 120 to be rotatable together with the sub-shaft 120 so that the first sub-gear 121 may rotate at the same rotational speed in the same rotational direction as the sub-shaft 120 about the same axis as the rotation axis of the sub-shaft 120.

A plurality of first sub-teeth 121*a* may be formed on an outer circumferential surface of the first sub-gear 121. The plurality of first sub-teeth 121*a* may be engaged with the plurality of first initial teeth 111*a* of the first initial gear 111. Specifically, the rotation of the first initial gear 111 may cause the first sub-gear 121 to rotate through the engagement between the plurality of first initial teeth 111*a* and the plurality of first sub-teeth 121*a*.

A diameter of the first sub-gear 121 may be the same as a diameter of the first initial gear 111. In addition, the number of the plurality of first sub-teeth 121*a* formed on the outer circumferential surface of the first sub-gear 121 may be the same as the number of the plurality of first initial teeth 111*a* formed on the outer circumferential surface of the first initial gear 111.

Specifically, as illustrated in FIG. 6, a ratio between a diameter D1 of the first initial gear 111 and a diameter D2 of the first sub-gear 121 may be approximately 1:1. In addition, a ratio between the number of the plurality of first initial teeth 111*a* and the number of the plurality of first sub-teeth 121*a* may be approximately 1:1.

The first sub-gear 121 may rotate in engagement with the first initial gear 111, and the rotational speed of the first sub-gear 121 may be the same as the rotational speed of the first initial gear 111. In other words, a gear ratio between the first initial gear 111 and the first sub-gear 121 may be approximately 1:1, and a rotation ratio between the first initial gear 111 and the first sub-gear 121 may be approximately 1:1. While the first initial gear 111 rotates once, the first sub-gear 121 may also rotate once. In addition, while the first initial gear 111 rotates approximately 360 degrees, the first sub-gear 121 may also rotate 360 degrees.

The second sub-gear 141 may be in a second side space defined by the second surface 150*b* of the substrate 150 (for example, positioned below the second surface 150*b* of the substrate 150). In other words, the second sub-gear 141 may be provided on the opposite side of the first sub-gear 121 with respect to the substrate 150.

The second sub-gear 141 may be fixed to or provided on the sub-shaft 120 and the second sub-gear 141 may be in a substantially cylindrical shape, like the first sub-gear 121.

Specifically, the second sub-gear 141 may be provided on the same axis as, or coaxial with, the sub-shaft 120 to be rotatable together with the sub-shaft 120 so that the second sub-gear 141 may rotate at the same rotational speed in the same rotational direction as the first sub-gear 121 and the sub-shaft 120 about the same axis as the rotation axis of the first sub-gear 121 and the sub-shaft 120.

A plurality of second sub-teeth 141*a* may be formed on an outer circumferential surface of the second sub-gear 141. As the second sub-gear 141 rotates, the plurality of second sub-teeth 141*a* may rotate and move along the outer circumferential surface of the second sub-gear 141.

The second initial gear 131 may be in the second side space defined by the second surface 150*b* of the substrate 150 (for example, positioned below the second surface 150*b* of the substrate 150). In other words, the second initial gear 131 may be provided on the opposite side of the first initial gear 111 with respect to the substrate 150.

The second initial gear 131 may be fixed to or provided on the second initial shaft 130 to be rotatable together with the second initial shaft 130 and may be in a substantially cylindrical shape. Here, the second initial shaft 130 may be arranged or provided substantially parallel to the sub-shaft 120. The second initial shaft 130 may be separated from the first initial shaft 110. In addition, a rotation axis of the second initial shaft 130 may be substantially aligned with, substantially the same as, the rotation axis of the first initial shaft 110.

Specifically, the second initial gear 131 may be coaxial with, provided on the same axis as, the second initial shaft 130 so that the second initial gear 131 may rotate at the same rotational speed in the same rotational direction as the second initial shaft 130 about the same axis as the rotation axis of the second initial shaft 130.

A plurality of second initial teeth 131*a* may be formed on an outer circumferential surface of the second initial gear 131. As the second initial gear 131 rotates, the plurality of second initial teeth 131*a* may rotate and move along the outer circumferential surface of the second initial gear 131.

The plurality of second initial teeth 131*a* of the second initial gear 131 may be engaged with the plurality of second sub-teeth 141*a* of the second sub-gear 141. Specifically, the rotation of the second sub-gear 141 may cause the second initial gear 131 to rotate by the engagement between the plurality of second sub-teeth 141*a* and the plurality of second initial teeth 131*a*.

A diameter of the second initial gear 131 may be different from a diameter of the second sub-gear 141. In addition, the number of the plurality of second initial teeth 131*a* formed on the outer circumferential surface of the second initial gear 131 may be different from the number of the plurality of second sub-teeth 141*a* formed on the outer circumferential surface of the second sub-gear 141.

As illustrated in FIG. 7, a diameter D3 of the second initial gear 131 may be smaller than a diameter D4 of the second sub-gear 141. In addition, the number of the plurality of second initial teeth 131*a* may be less than the number of the plurality of second sub-teeth 141*a*. For example, a ratio between the diameter D3 of the second initial gear 131 and the diameter D4 of the second sub-gear 141 may be approximately 1:1.25. In addition, a ratio between the number of the plurality of second initial teeth 131*a* and the number of the plurality of second sub-teeth 141*a* may be approximately 1:1.25.

The second initial gear 131 may rotate in engagement with the second sub-gear 141, but the rotational speed of the second initial gear 131 may be different from the rotational speed of the second sub-gear 141. The rotational speed of the second initial gear 131 may be higher than the rotational speed of the second sub-gear 141. For example, a gear ratio between the second sub-gear 141 and the second initial gear 131 may be approximately 1:1.25, and a rotation ratio between the second sub-gear 141 and the second initial gear 131 may be approximately 1.25:1. In other words, while the second sub-gear 141 rotates once, the second initial gear 131 may rotate 1.25 times. In addition, while the second sub-gear 141 rotates approximately 288 degrees, the second initial gear 131 may rotate 360 degrees.

As described above, the gear ratio between the first initial gear 111 and the first sub-gear 121 may be approximately 1:1, and while the first initial gear 111 rotates once, the first sub-gear 121 may rotate approximately once. In this case, both the first sub-gear 121 and the second sub-gear 141 may be fixed to or provided on the sub-shaft 120 to rotate together with the sub-shaft 120.

Therefore, the rotation ratio of the first initial gear 111 and the second initial gear 131 may be approximately 1:1.25. Specifically, while the first initial gear 111 rotates four times, the second initial gear 131 may rotate five times.

In other words, while the first initial gear 111 and the second initial gear 131 rotate at the same time at a reference position and both the first initial gear 111 and the second initial gear 131 return to the reference position, the first initial gear 111 may rotate four times and the second initial gear 131 may rotate five times.

Further, while the first initial gear 111 rotates four times, the first sub-gear 121 may rotate 1440 degrees. In addition, while the second initial gear 131 rotates five times, the second sub-gear 141 may rotate 1440 degrees. The rotation of the first and second sub-gears 121 and 141 may be the same as the rotation of the sub-shaft 120, and the rotation of the sub-shaft 120 may be the same as the rotation of the first initial shaft 110. Therefore, while the first initial gear 111 and the second initial gear 131 rotate at the same time at the reference position and both the first initial gear 111 and the second initial gear 131 return to the reference position, the first initial shaft 110 may rotate 1440 degrees.

Accordingly, the rotation of the first initial shaft 110 up to 1440 degrees may be identified by combination of the rotation angle of the first initial gear 111 and the rotation angle of the second initial gear 131.

The second initial rotor 133 may be provided between the substrate 150 and the second initial gear 131 in the second side space defined by the second surface 150*b* of the substrate 150 (for example, positioned below the second surface 150*b* of the substrate 150), and the second initial rotor 133 may be in a substantially disc shape. In other words, the substrate 150, the second initial rotor 133, and the second initial gear 131 may be stacked on the second surface 150*b* of the substrate 150 in order.

The second initial rotor 133 may be fixed to or provided on the second initial shaft 130, and the second initial rotor 133 may be in a substantially disc shape. The second initial rotor 133 may be coaxial with, or provided on the same axis as, the second initial shaft 130 and be configured to be rotatable together with the second initial shaft 130 so that the second initial rotor 133 may rotate at the same rotational speed in the same rotational direction as the second initial shaft 130 about the same axis as the rotation axis of the second initial shaft 130. Further, the second initial rotor 133 may rotate at the same rotational speed in the same rotational direction as the second initial gear 131 about the same axis as the rotation axis of the second initial gear 131.

A shape of the second initial rotor 133 may be the same as that of the first initial rotor 113 illustrated in FIG. 8.

The second sensing coil 152 may be provided or disposed on the second surface 150*b* of the substrate 150 and the second sensing coil 152 may be in a substantially disc shape. The second sensing coil 152 is fixed on the second surface 150*b* of the substrate 150 and does not rotate together with the second initial shaft 130.

The second sensing coil 152 may be disposed in a zigzag manner between circumferences of imaginary circles having different radii. For example, the second sensing coil 152 may be disposed in a zigzag manner between a third circle having a third radius and a fourth circle having a fourth radius greater than the third radius. Further, a shape of the second sensing coil 152 may be the same as that of the first sensing coil 151 illustrated in FIG. 8.

The center of the annular second sensing coil 152 may be substantially the same as, or be coaxial with, the center of the second initial rotor 133. In other words, an imaginary second straight line extending from the rotation axis of the second initial rotor 133 may pass through the center of the annular second sensing coil 152.

The second initial rotor 133 may be provided in the vicinity of the second sensing coil 152. In other words, the second initial rotor 133 may rotate about the center of the second sensing coil 152 in the vicinity of the second sensing coil 152.

Thereby, the plurality of second rotor teeth 133*a* may periodically pass near the second sensing coil 152 the second initial rotor 133 rotates.

In this case, the second initial rotor 133 and the plurality of second rotor teeth 133*a* may be made of a magnetic material, and as the plurality of second rotor teeth 133*a*, which are made of the magnetic material, periodically pass near the second sensing coil 152, the reluctance of the second sensing coil 152 may periodically change and the impedance of the second sensing coil 152 may also periodically change. For example, the impedance or reluctance of the second sensing coil 152 may change in a cycle in which the second rotor teeth 133*a* rotate once.

Therefore, the rotation of the second initial rotor 133 may be detected or identified by measuring the periodic change in impedance or reluctance of the second sensing coil 152. The rotation of the first initial rotor 113 may be detected or identified by measuring the periodic change in impedance or reluctance of the first sensing coil 151.

The rotation of the first initial rotor 113 may be the same as the rotation of the first initial gear 111, and the rotation of the second initial rotor 133 may be the same as the rotation of the second initial gear 131.

In addition, as described above, the rotation of the first initial shaft 110 up to 1440 degrees may be identified by combination of the rotation angle of the first initial gear 111 and the rotation angle of the second initial gear 131. Therefore, the rotation of the first initial shaft 110 up to 1440 degrees may be identified by the periodic change in impedance or reluctance of the first sensing coil 151 and the periodic change in impedance or reluctance of the second sensing coil 152.

As described above, the position sensor 100 may include the first initial shaft 110 that rotates with the linear movement of the rack bar assembly 50, the first initial rotor 113 that rotates together with the first initial shaft 110, the first sensing coil 151 whose impedance or reluctance changes depending on the rotation of the first initial rotor 113, the sub-shaft 120 that rotates at a first rate with respect to the rotation of the first initial shaft 110, the second initial shaft 130 that rotates at a second rate with respect to the rotation of the sub-shaft 120, the second initial rotor 133 that rotates together with the second initial shaft 130, and the second sensing coil 152 whose impedance or reluctance changes depending on the rotation of the second initial rotor 133.

By measuring the change in impedance or reluctance of the first sensing coil 151 and the change in impedance or reluctance of the second sensing coil 152, the rotation angle of the first initial shaft 110 may be identified or detected, and further, the linear displacement of the rack bar assembly 50 may be identified or determined.

Hereinafter, a configuration for measuring the change in impedance or reluctance of the first sensing coil 151 and the change in impedance or reluctance of the second sensing coil 152 will be described.

Figure 9:
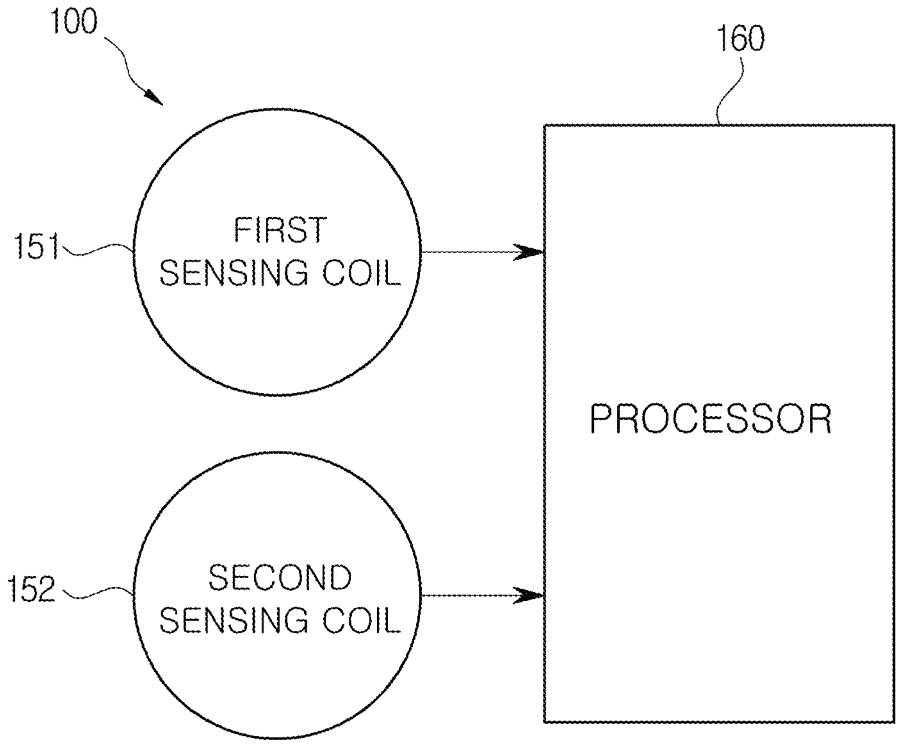
FIG. 9 is a block diagram for illustrating a control configuration of a position sensor in accordance with an embodiment of the present disclosure.
Figure 10A:
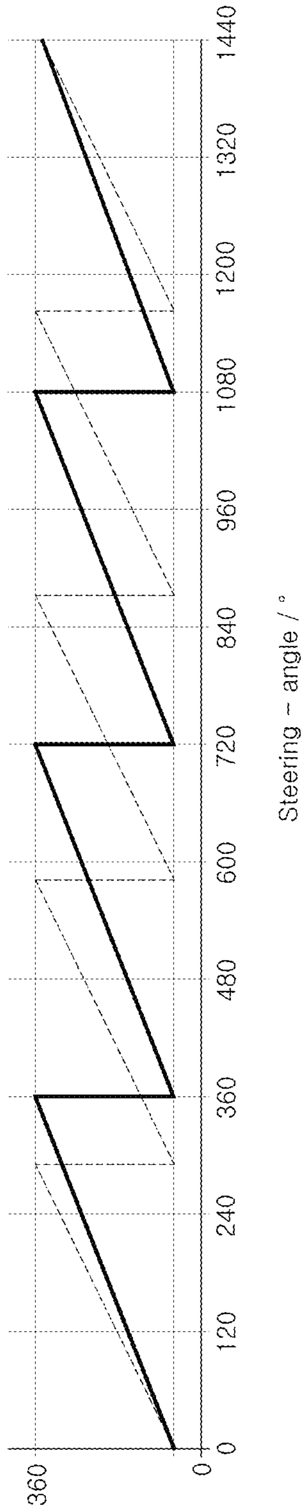
FIGS. 10A and 10B are graphs for illustrating an example of identifying a rotation angle of a shaft by a position sensor in accordance with an embodiment of the present disclosure.
Figure 10B:
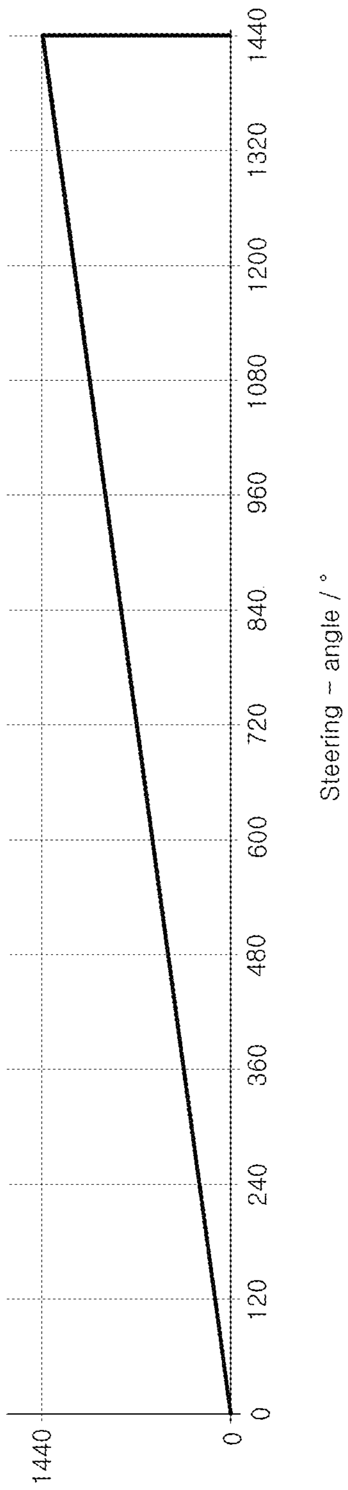

FIG. 9 is a block diagram for illustrating a control configuration of a position sensor in accordance with an embodiment of the present disclosure. FIGS. 10A and 10B are graphs for illustrating an example of identifying a rotation angle of a shaft by a position sensor in accordance with an embodiment of the present disclosure.

As illustrated in FIG. 9, the position sensor 100 may include the first sensing coil 151, the second sensing coil 152, and a processor 160.

As illustrated in FIG. 8 described above, the first sensing coil 151 may be disposed in the zigzag manner along the circumferential direction in the annular area between the first circle 151*a* having the first radius and the second circle 151*b* having the second radius. In other words, the distance between the first sensing coil 151 and the center of the first sensing coil 151 may periodically change.

The first initial rotor 113 may be rotatably provided in the vicinity of the first sensing coil 151. The impedance or reluctance of the first sensing coil 151 may periodically change according to the rotation of the first initial rotor 113. For example, while the first initial rotor 113 rotates, which is made of a magnetic material, a portion of the first rotor teeth 113*a* of the first initial rotor 113 corresponding to an inner area of the first sensing coil 151 may periodically change. Thereby, the reluctance of the first sensing coil 151 may periodically change, and a periodic induced current may be induced in the first sensing coil 151.

The second sensing coil 152 may have the same configuration as the first sensing coil 151 described above.

The second initial rotor 133 may be rotatably provided in the vicinity of the second sensing coil 152. The impedance or reluctance of the second sensing coil 152 may periodically change according to the rotation of the second initial rotor 133.

The processor 160 may identify or determine the impedance or reluctance (or a periodic change thereof) of the first sensing coil 151 and the impedance or reluctance (or a periodic change thereof) of the second sensing coil 152.

For example, the processor 160 may measure a first induced current and a second induced current induced in the first sensing coil 151 and the second sensing coil 152, respectively. The processor 160 may identify the reluctance (or the change thereof) of the first sensing coil 151 and the reluctance (or the change thereof) of the second sensing coil 152 based on the first induced current and the second induced current.

For another example, the processor 160 may periodically apply a voltage signal to each of the first sensing coil 151 and the second sensing coil 152 and measure a current of each of the first sensing coil 151 and the second sensing coil 152. The processor 160 may identify or determine the impedance (or the change thereof) of the first sensing coil 151 and the impedance (or the change thereof) of the second sensing coil 152 based on the respective currents of the first sensing coil 151 and the second sensing coil 152.

The processor 160 may identify the rotation angle of the first initial rotor 113 based on the impedance or reluctance (or the periodic change thereof) of the first sensing coil 151. In addition, the processor 160 may identify the rotation angle of the second initial rotor 133 based on the impedance or reluctance (or the periodic change thereof) of the second sensing coil 152.

For example, the processor 160 may identify or determine that the first initial rotor 113 has rotated once based on the change in impedance or reluctance of the first sensing coil 151 per cycle. In addition, the processor 160 may identify or determine that the second initial rotor 133 has rotated once based on the change in impedance or reluctance of the second sensing coil 152 per cycle.

The processor 160 may identify or determine the rotation angle of the first initial shaft 110 based on the rotation angle of the first initial rotor 113 and the rotation angle of the second initial rotor 133.

As described above, the rotation of the first initial shaft 110 may be the same as the rotation of the first initial rotor 113. For example, a rotation ratio between the first initial shaft 110 and the first initial rotor 113 may be approximately 1:1. In other words, as illustrated in FIGS. 10A and 10B, while the first initial rotor 113 rotates 360 degrees (rotation angle on a y-axis), the first initial shaft 110 may rotate approximately 360 degrees (rotation angle on an x-axis).

In addition, a rotation ratio between the first initial shaft 110 and the second initial rotor 133 may be set by a predetermined gear ratio between the second initial gear 131 and the second sub-gear 141. For example, a rotation ratio between the second initial rotor 133 and the first initial shaft 110 may be approximately 1.25:1. In other words, as illustrated in FIGS. 10A and 10B, while the second initial rotor 133 rotates 360 degrees (rotation angle on the y-axis), the first initial shaft 110 may rotate approximately 288 degrees (rotation angle on the x-axis).

A pair of the rotation angle of the first initial rotor 113 and the rotation angle of the second initial rotor 133 may correspond to the rotation angle of the first initial shaft 110. For example, as illustrated in FIGS. 10A and 10B, when the rotation angle of the first initial shaft 110 is "0" degrees, the rotation angle of the second initial rotor 133 is "0" degrees. Then, when both the rotation angle of the first initial rotor 113 and the rotation angle of the second initial rotor 133 become "0" degrees again, the rotation angle of the first initial shaft 110 is "1440" degrees.

Therefore, the rotation angle of the first initial shaft 110 may be between "0" and "1440" degrees, and the rotation angle of the first initial shaft 110 may correspond to a pair of unique rotation angles of the first initial rotor 113 and the second initial rotor 133. In other words, the rotation angle of the first initial shaft 110 between "0" and "1480" degrees may be determined or identified by the pair of the rotation angle of the first initial rotor 113 and the rotation angle of the second initial rotor 133.

As such, the processor 160 may determine or identify the rotation angle of the first initial shaft 110 within a predetermined angular range (e.g., between 0 degrees and 1440 degrees) based on the impedance or reluctance (or the periodic change thereof) of the first sensing coil 151 and the impedance or reluctance (or the periodic change thereof) of the second sensing coil 152.

In addition, the processor 160 may provide or transmit the identified rotation angle of the first initial shaft 110 to the steering controller 70 of the steering apparatus 1.

As described above, the steering controller 70 may determine or identify an actually measured position of the rack bar assembly 50 based on the output signal of the position sensor 100. In addition, the steering controller 70 may compare the actually measured position with the target position, and control the steering motor 60 so that the actually measured position of the rack bar assembly 50 follows the target position.

In addition, the angle sensor 30 of the steering apparatus 1 may have substantially the same configuration and perform substantially the same function as the position sensor 100. The position sensor 100 may detect or identify the rotation angle of the first initial shaft 110 connected to the rack bar assembly 50, while the angle sensor 30 may detect or identify the rotation angle of the steering column 20 connected to the steering wheel 10.

As is apparent from the above description, according to one aspect of the present disclosure, it is possible to provide a position sensor and a steering apparatus capable of detecting the position and movement of a rack bar.

According to one aspect of the present disclosure, it is possible to provide a position sensor and a steering apparatus capable of improving reliability, stability, and robustness of position detection and movement detection.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A position sensor comprising:

a substrate having a first surface and a second surface opposite to the first surface;

a first initial shaft positioned above the first surface of the substrate, and disposed perpendicular to the substrate;

a first initial gear mounted to the first initial shaft and positioned above the first surface of the substrate;

a first initial rotor mounted to the first initial shaft and positioned above the first surface of the substrate;

a first sensing coil disposed on the first surface of the substrate;

a sub-shaft passing through the first and second surfaces of the substrate in a direction perpendicular to the substrate and parallel to the first initial shaft;

a first sub-gear mounted to the sub-shaft and positioned above the first surface of the substrate, and rotatably engaged with the first initial gear;

a second sub-gear mounted to the sub-shaft and positioned below the second surface of the substrate;

a second initial shaft separated from the first initial shaft, positioned below the second surface of the substrate, and disposed perpendicular to the substrate and parallel to the sub-shaft;

a second initial gear mounted to the second initial shaft, positioned below the second surface of the substrate, and rotatably engaged with the second sub-gear;

a second initial rotor mounted to the second initial shaft and positioned below the second surface of the substrate; and a second sensing coil disposed on the second surface of the substrate.

2. The position sensor according to claim 1, wherein a first gear ratio between the first initial gear and the first sub-gear is different from a second gear ratio between the second initial gear and the second sub-gear.

3. The position sensor according to claim 1, wherein a diameter of the first initial gear is different from a diameter of the second initial gear.

4. The position sensor according to claim 1, wherein a diameter of the first sub-gear is different from a diameter of the second sub-gear.

5. The position sensor according to claim 1, wherein:

a diameter of the first initial gear is identical to a diameter of the first sub-gear, and a diameter of the second initial gear is smaller than a diameter of the second sub-gear.

6. The position sensor according to claim 1, wherein:

the first initial gear and the first initial rotor are coaxial with the first initial shaft, and the second initial gear and the second initial rotor are coaxial with the second initial shaft.

7. The position sensor according to claim 1, wherein:

the first initial rotor is coaxial with the first sensing coil, and the second initial rotor is coaxial with the second sensing coil.

8. The position sensor according to claim 1, wherein:

a plurality of first rotor teeth are formed on a circumference of the first initial rotor, and a plurality of second rotor teeth are formed on a circumference of the second initial rotor.

9. The position sensor according to claim 8, wherein:

the first sensing coil is in a zigzag pattern, and the second sensing coil is in a zigzag pattern.

10. The position sensor according to claim 9, wherein:

a radial width of at least one of the plurality of first rotor teeth of the first initial rotor is equal to a radial width of the zigzag pattern of the first sensing coil, and a radial width of at least one of the plurality of second rotor teeth of the second initial rotor is equal to a radial width of the zigzag pattern of the second sensing coil.

11. The position sensor according to claim 8, wherein:

a circumferential width of at least one of the plurality of first rotor teeth of the first initial rotor is equal to a distance between adjacent two of the plurality of first rotor teeth, and a circumferential width of each of the plurality of second rotor teeth of the second initial rotor is equal to a distance between adjacent two of the plurality of second rotor teeth.

12. The position sensor according to claim 1, further comprising a processor electrically connected to the first sensing coil and the second sensing coil.

13. The position sensor according to claim 12, wherein the processor is configured to:

identify impedance or reluctance of the first sensing coil;

determine a rotation angle of the first initial rotor based on the impedance or reluctance of the first sensing coil;

identify impedance or reluctance of the second sensing coil; and determine a rotation angle of the second initial rotor based on the impedance or reluctance of the second sensing coil.

14. The position sensor according to claim 13, wherein the processor is configured to determine a rotation angle of the first initial shaft based on the rotation angle of the first initial rotor and the rotation angle of the second initial rotor.

15. The position sensor according to claim 1, wherein the first initial shaft is connected to a rack bar assembly of a vehicle.

16. A steering apparatus comprising:

a rack bar assembly connected to wheels of a vehicle;

a steering motor configured to generate torque for linearly moving the rack bar assembly;

an angle sensor configured to sense a rotation angle of a steering column connected to a steering wheel of the vehicle;

a first initial shaft connected to the rack bar assembly;

the position sensor of claim 1; and a controller configured to control the steering motor based on the rotation angle of the steering column sensed by the angle sensor and the rotation angle of the first initial shaft sensed by the position sensor.

17. The steering apparatus according to claim 16, wherein a first gear ratio between the first initial gear and the first sub-gear is different from a second gear ratio between the second initial gear and the second sub-gear.

18. The steering apparatus according to claim 16, wherein:

a diameter of the first initial gear is different from a diameter of the second initial gear, and a diameter of the first sub-gear is different from a diameter of the second sub-gear.

19. The steering apparatus according to claim 16, wherein the position sensor further includes a processor electrically connected to the first sensing coil and the second sensing coil, and the processor is configured to:

identify impedance or reluctance of the first sensing coil;

determine a rotation angle of the first initial rotor based on the impedance or reluctance of the first sensing coil;

identify impedance or reluctance of the second sensing coil; and determine a rotation angle of the second initial rotor based on the impedance or reluctance of the second sensing coil.

20. The steering apparatus according to claim 19, wherein the processor is configured to:

identify a rotation angle of the first initial shaft based on the rotation angle of the first initial rotor and the rotation angle of the second initial rotor; and provide an output signal associated with the rotation angle of the first initial shaft to the controller.

* * * * *